US012384186B2

(12) United States Patent
Fernández Vázquez et al.

(10) Patent No.: US 12,384,186 B2
(45) Date of Patent: Aug. 12, 2025

(54) GLASS-PRINTING MACHINE WITH CONTINUOUS TRANSPORTATION OF THE GLASS

(71) Applicant: TECGLASS SL, Lalin (ES)

(72) Inventors: Juan Javier Fernández Vázquez, Lalin (ES); José Manuel Barros López, Lalin (ES)

(73) Assignee: TECGLASS SL, Lalin (ES)

( * ) Notice: Subject to any disclaimer, the term of this patent is extended or adjusted under 35 U.S.C. 154(b) by 279 days.

(21) Appl. No.: 18/028,193

(22) PCT Filed: Sep. 20, 2021

(86) PCT No.: PCT/ES2021/070680
§ 371 (c)(1),
(2) Date: Mar. 23, 2023

(87) PCT Pub. No.: WO2022/064086
PCT Pub. Date: Mar. 31, 2022

(65) Prior Publication Data

US 2024/0025195 A1 Jan. 25, 2024

(30) Foreign Application Priority Data

Sep. 24, 2020 (ES) ............................ ESP202030963

(51) Int. Cl.
*B41M 5/00* (2006.01)
*B41J 3/407* (2006.01)
(Continued)

(52) U.S. Cl.
CPC .............. *B41M 5/007* (2013.01); *B41J 3/407* (2013.01); *B41J 11/007* (2013.01); *B41J 11/06* (2013.01)

(58) Field of Classification Search
CPC ........ B41M 5/007; B41J 11/007; B41J 11/06; B41J 3/407
See application file for complete search history.

(56) References Cited

U.S. PATENT DOCUMENTS 12,214,966 B2 * 2/2025 Fernández Vázquez ..................... B41J 3/407

FOREIGN PATENT DOCUMENTS

ES 2354667 A1 3/2011
ES 2398008 A1 3/2013
(Continued)

OTHER PUBLICATIONS

International Search Report dated Oct. 22, 2021.

*Primary Examiner* — Henok D Legesse
(74) *Attorney, Agent, or Firm* — William H. Honaker; Dickinson Wright PLLC

(57) ABSTRACT

A glass-printing machine with continuous glass transport includes: a loading station receiving glass panes to be printed, stops for fixing the glass panes to be printed, a viewing means or a mechanical positioning system downstream of a charging station, a printing bridge arranged downstream of the viewing means or the mechanical positioning system, and an unloading station allowing the unloading of the printed glass panes. The machine includes an upper level arranged above a lower level, a series of carriages running continuously driven by linear motors travelling in one direction on the upper level and in the opposite direction on the lower level. This change of direction is made possible by lifting and lowering drives. The stops are slidable through guides, where the guides are at least two arranged transversely to each other and on each guide a pair of stops is arranged, each at one end of the guide.

11 Claims, 7 Drawing Sheets

(51) Int. Cl.
*B41J 11/00* (2006.01)
*B41J 11/06* (2006.01)

(56) References Cited

FOREIGN PATENT DOCUMENTS

| | | | | | |
|---|---|---|---|---|---|
| ES | 2537154 | A1 | | 6/2015 | |
| ES | 2565692 | A1 | | 4/2016 | |
| ES | 2565692 | B1 | * | 8/2017 | B41J 3/407 |
| WO | WO-0068118 | A1 | * | 11/2000 | B65G 35/06 |

* cited by examiner

GLASS-PRINTING MACHINE WITH CONTINUOUS TRANSPORTATION OF THE GLASS

CROSS-REFERENCE TO RELATED APPLICATIONS

This application is a U.S. National Stage of International Application No. PCT/ES2021/070680, filed on Sep. 20, 2021, which claims priority to Spanish Patent Application No. P202030963 filed on Sep. 24, 2020, the entire disclosures of which are incorporated herein in their entireties.

PURPOSE OF THE INVENTION

The object of the present invention, as stated in its title, is a glass-printing machine with continuous transportation of the glass comprising means for positioning with a precision of less than 0.1 mm.

The present invention is characterised by the special design and configuration of each and every element of a glass printing machine that combines the advantages of a rotary drive with those of a drive based on linear technology. A system of glass transport carriages for digital printing is created, where the carriages move linearly in an "endless" or continuous system, so that the advantages of both systems are obtained:

Linear drive: precision, speed, and constant acceleration of the movement for a quality print.

Rotary drive: endless system, which provides in a small space a continuous advance of the product to be conveyed without interruptions, achieving an optimal working cycle.

Therefore, the present invention belongs to the scope of glass printing systems.

BACKGROUND OF THE INVENTION

Machines with linear drives with limited loads and precisions are known in the state of the art, but none of the linear drives are used for glass printing.

On one hand, linear drives have a load limit of less than 20 Kg: on the other hand, the precision they achieve can be improved.

Moreover, in glass printing, due to the size of the product to be moved, i.e. the glass panes, the machine must turn the printing table 180°, which complicates the operation of the machine and also limits the dimensions of the machine itself and of the products to be moved.

Therefore, the aim of the present invention is to develop a printing machine or system that allows higher loads than those used hitherto, where the precision is higher than 0.08 mm and where the rotation of the printing table is solved, developing a machine such as the one described below, the essence of which is described in the first claim.

DESCRIPTION OF THE INVENTION

The object of the present invention is a glass-printing machine with continuous transportation of the glass, i.e., there are no interruptions in the glass transport process.

The printing machine comprises a loading station where the glass panes to be printed are received, followed by mechanical means for attaching the glass pane, and then a viewing or mechanical positioning system followed by a printing system, and finally an unloading station, with the carriages running between an upper level along the above elements and returning to the starting point via a lower level, the change of level at the loading and unloading station being carried out by means of lifting and lowering drives.

Preferably but not limited to, at the time of printing the carriages are transported with a drive that has an optical linear encoder with a resolution of less than 4 microns.

The continuous movement of the carriages can be carried out in different ways depending on the number of carriages running in the printing machine.

In the case that the machine has two carriages, each one has its own linear drive and a lifting and lowering drive integrated, so that the shifting from the loading station to the unloading station takes place on the upper level thanks to the linear motor integrated in the carriage itself and, upon arrival at the unloading station, the carriage is lowered by means of another drive, returning to the loading station on a lower level but using the same linear drive to finally lift the carriage by means of the lifting and lowering drive.

If the machine has more than two carriages, the carriages are moved by drives independent of the carriages, the carriages returning to the starting point of the machine, once lowered, driven by a system of belts, racks, spindles, pneumatic, but totally independent of the linear movement of the upper level.

The number of carriages and linear motors to drive them will depend on the maximum length of glass to be processed and on the required cycle times.

Each carriage at the inlet of the machine is able to pick up a glass pane with the vertical movement, if available at the loading station.

Each carriage at the outlet of the machine is capable of leaving a glass pane with the vertical movement, if available at the unloading station.

Each carriage has a mechanical fixing system that is activated after receiving the glass. The fixing system consists of stops made of plastic material that can be actuated by a pneumatic cylinder along a guide so that said stops always push on the same position and, therefore, the scanner only has to measure the glass a first time until the glass format is changed again.

By interposing the glass fixing system between the reception of the glass and the viewing means, it is possible to improve the tolerance from a tolerance in a printing system without glass fixing means of +/−0.1 mm to a tolerance of +/−0.08 mm.

The position correction to achieve a tolerance of +/−0.08 can be done in two ways:

Manually, by entering the desired shifting of the image in a dedicated menu.

Automatically, with a scanner at the outlet that moves the image once it sees how the first piece comes out and sends information to the heads until it is corrected to the minimum tolerance.

The fact that the printing machine has a glass fixing system allows:

A greater precision.

The possibility of adjusting the printing automatically with a second scanner.

The possibility of printing glasses in pairs with offset, which is another market need, which have to be fixed so that the top glass does not slip.

Each carriage can be slotted to be integrated and coupled with a loading or unloading belt system for smooth transfer of the glass, or instead the carriage itself can have an integrated roller, belt, or band conveyor.

On the upper level, after the loading station, a vision system can be provided to know the position of each glass, thereby avoiding the installation of the mechanical system.

The installation of a mechanical positioning system or a vision system will depend on the type of glass of the customer and the positioning accuracy, the mechanical system being the most accurate.

The printing machine can be equipped with a cleaning station to clean the carriages after the painted glass has been deposited. In case ink has been spilled on the plane, so that the next glass is not stained.

Alternatively but not exclusively, supports can be placed on each plane, raised above the plane and with quick coupling to configure the machine according to the type of glass. In this way the glass does not touch the table, and the supports are always under the glass to avoid ink stains.

The logical thing to do would be to install either a carriage cleaning station or supports that raise the glass and prevent it from touching the table.

The use of cleaning rollers allows for greater automation of the process, but requires more maintenance and would make the machine more expensive.

The use of raised supports requires an adjustment when changing the type of glass.

The features described above allow a glass printing system with continuous transport to be obtained, with a precision of less than 0.1 mm and allows the handling of large loads, which to all intents and purposes is a major advance in the efficiency and versatility of the machine compared to machines of the state of the art.

Unless indicated otherwise, all the technical and scientific elements used in this specification have the meaning usually understood by a person skilled in the art to which this invention belongs. In the practice of this invention, methods and materials similar or equivalent to those described in the specification may be used.

In the description and claims, the word "comprises" and its variants do not intend to exclude other technical characteristics, additives, components or steps. For persons skilled in the art, other objects, advantages and characteristics of the invention will be partly inferred from the description and partly from the practice of the invention.

EXPLANATION OF THE FIGURES

In order to complement the description being made herein, and with the object of aiding the better understanding of the characteristics of the invention, in accordance with a preferred practical embodiment thereof, said description is accompanied, as an integral part thereof, by a set of drawings where, in an illustrative and non-limiting manner, the following has been represented.

PREFERRED EMBODIMENT OF THE INVENTION

In view of the figures, a preferred embodiment of the proposed invention is described below.

Figure 1:
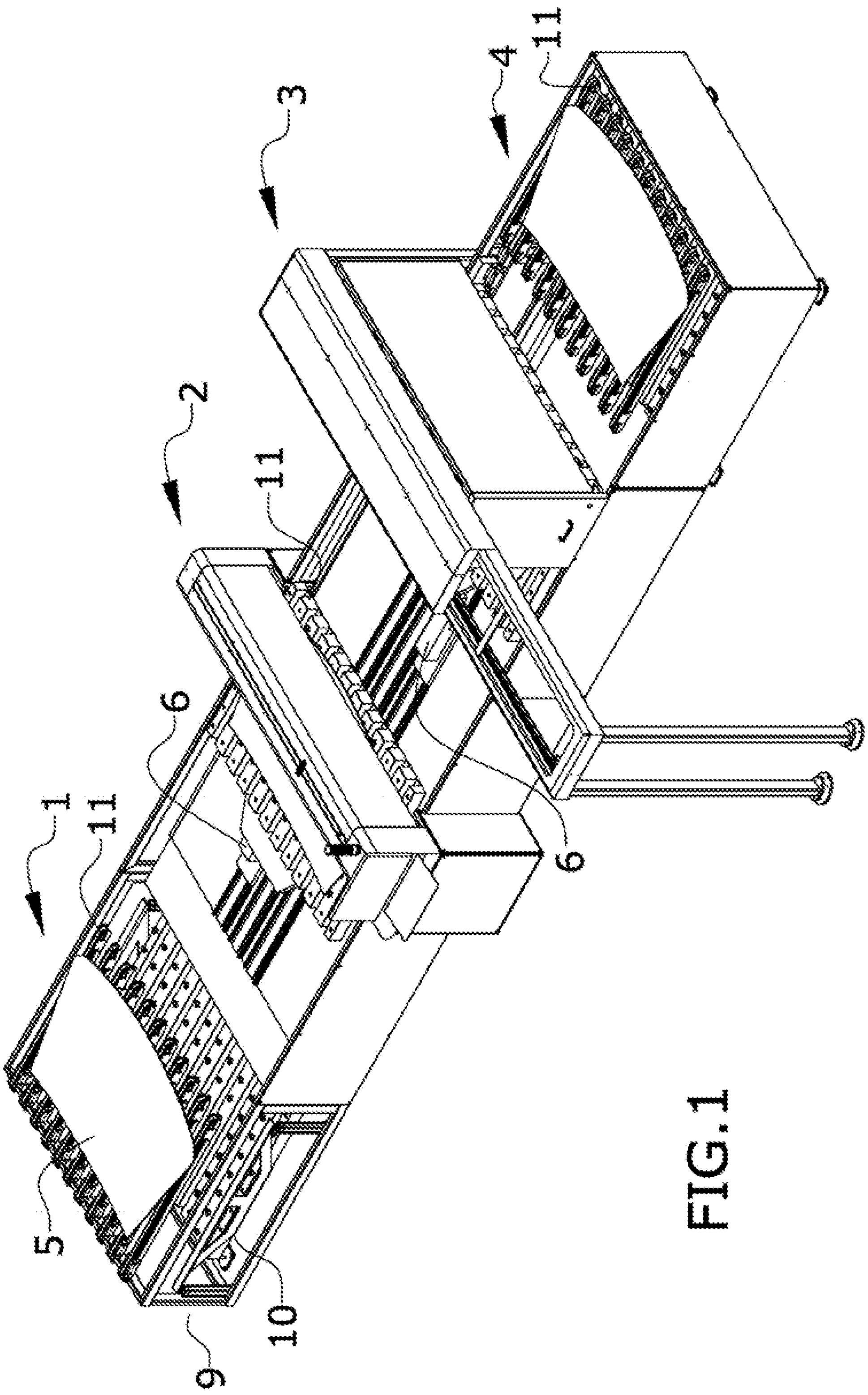
FIG. 1 shows a perspective view of the machine of the invention.
Figure 2:
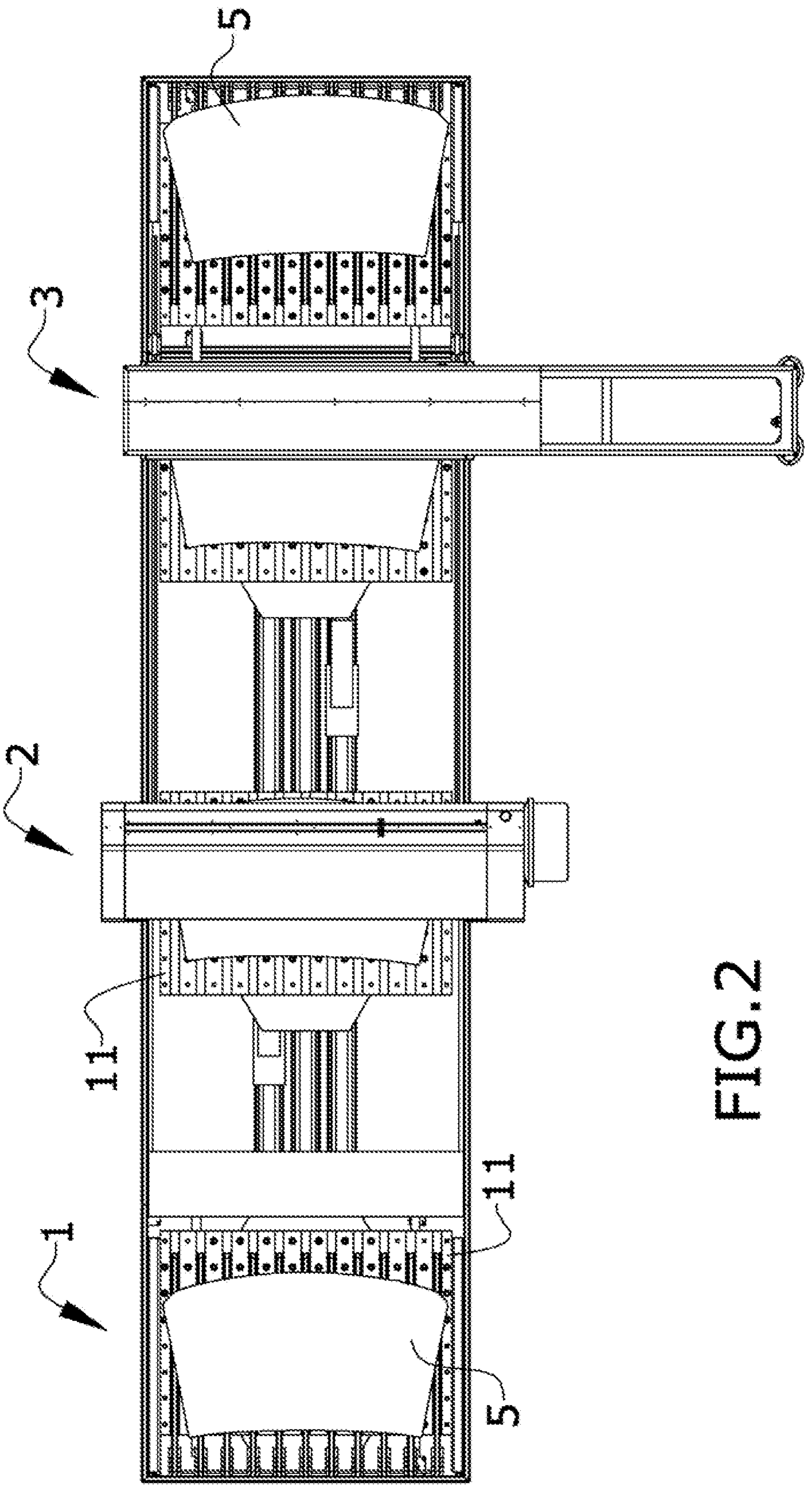
FIG. 2 shows a plan view of the printing machine of the invention.
Figure 3:
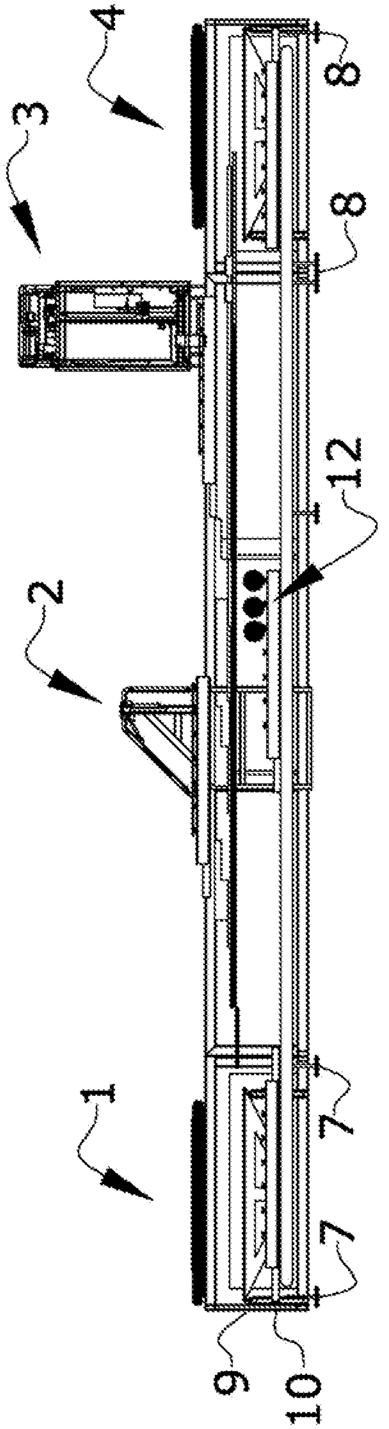
FIG. 3 shows a side view of the printing machine of the invention.

FIGS. 1 to 3 show that the machine comprises:

- a loading station (1) receiving the glass panes (5) to be printed
- a viewing means (2) or a mechanical positioning system, preferably arranged downstream of the loading station
- a printing bridge (3) preferably arranged downstream of the viewing means or mechanical positioning system
- an unloading station (4) allowing the unloading of the printed glass panes Wherein the machine comprises an upper level (9) arranged on a lower level (10), a series of carriages (11) running continuously in one direction on the upper level (9) and in the opposite direction on the lower level (10), having means to achieve the lifting and lowering of the carriages between the upper level (9) and the lower level (10).

In a first embodiment, when the machine has more than two carriages to achieve this change of direction, the machine comprises a first vertical drive (7) at the loading station (1) that lifts the carriages (11) from the lower level (10) to the upper level (9) and a second vertical drive (8) at the unloading station (4) that lowers the carriages (11) from the upper level (9) to the lower level (10).

The first and second vertical drives (7) and (8) can be pneumatic, electric, or hydraulic, or driven by linear motors.

On the first level the carriages (11) are driven by linear motors (6), where the number of carriages and linear motors will depend on the maximum length of the glass panes to be processed and the time required.

In this first embodiment the shifting of the carriages is carried out by the linear motors (6) which are independent of the carriages themselves.

FIG. 3 shows that on the lower level there is a cleaning station (12) consisting of several rollers, such that when each carriage (11) passes by said cleaning station it is subjected to a cleaning process to remove any traces of paint that may have fallen on it and prevent it from staining other glass panes.

Figure 4:
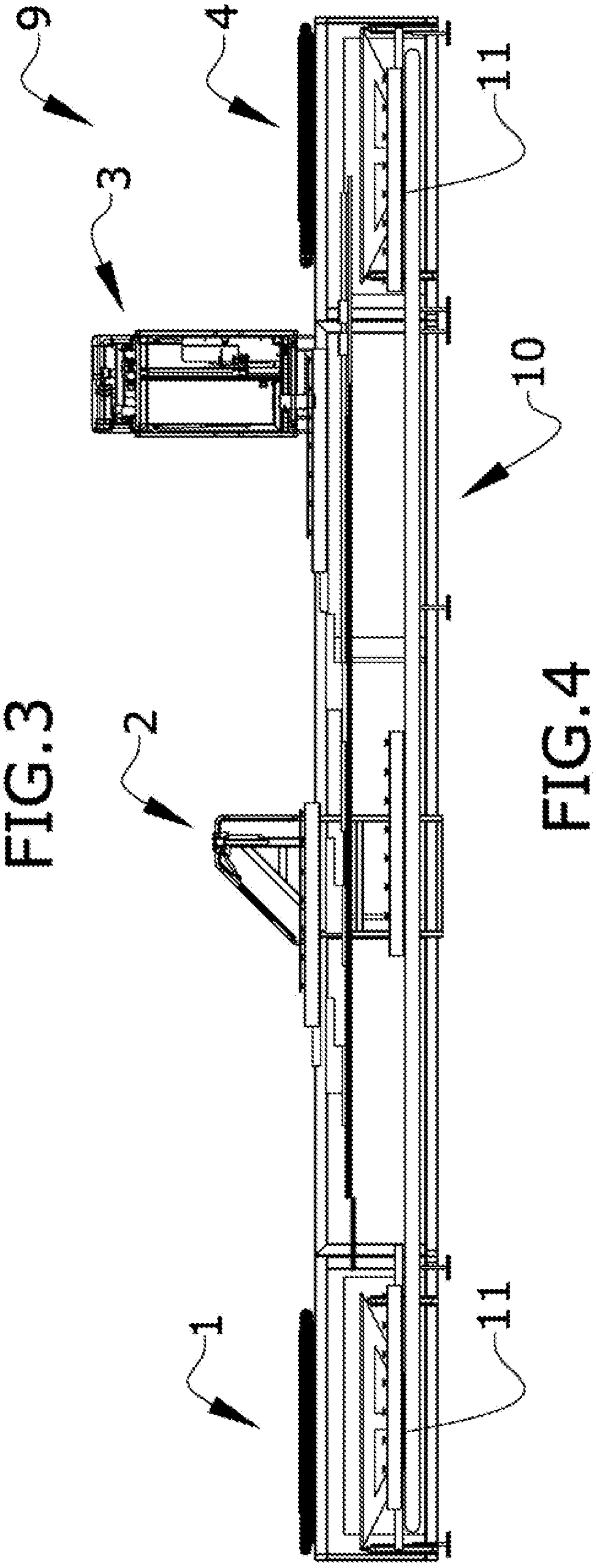
FIG. 4 shows a side view of the printing machine with the flow of carriages.

FIG. 4 shows schematically the flow of carriages (11) which, on the upper level (9) run from the loading station (1) to the unloading station (4), returning on a lower level (10) from the unloading station (4) to the loading station (1), changing levels by means of a first vertical drive (7) and a second vertical drive (8).

Figure 5:
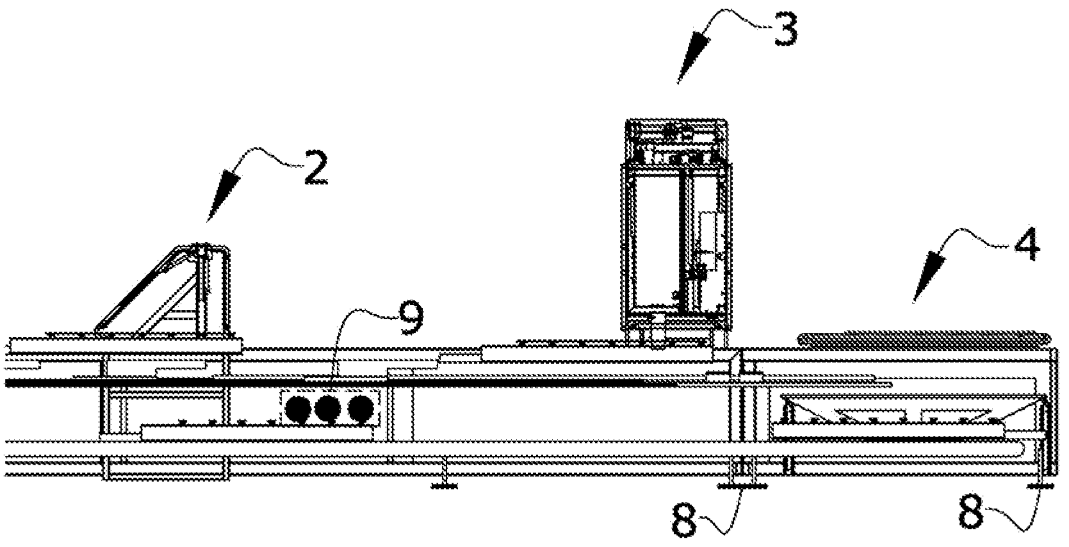
FIG. 5 shows an enlarged view of the side view of the machine showing the cleaning station.

FIG. 5 shows an enlarged view of the cleaning station (12) arranged on the lower level (10).

Figure 6:
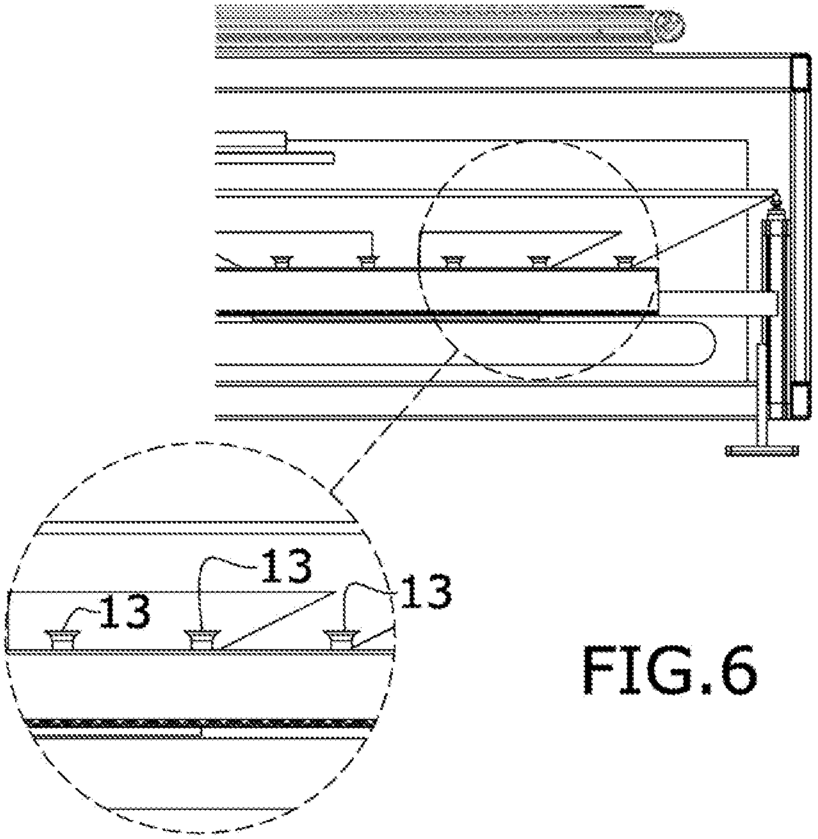
FIG. 6 shows an enlarged view of the raised supports used to prevent the glass from contacting the table.

FIG. 6 shows an alternative but not exclusive solution to the cleaning station (9), consisting of supports (13) raised above the lower level (10) and with quick coupling to prevent the glass from touching the table, so that the supports are always under the glass, thus preventing ink stains on the glass.

Figure 7:
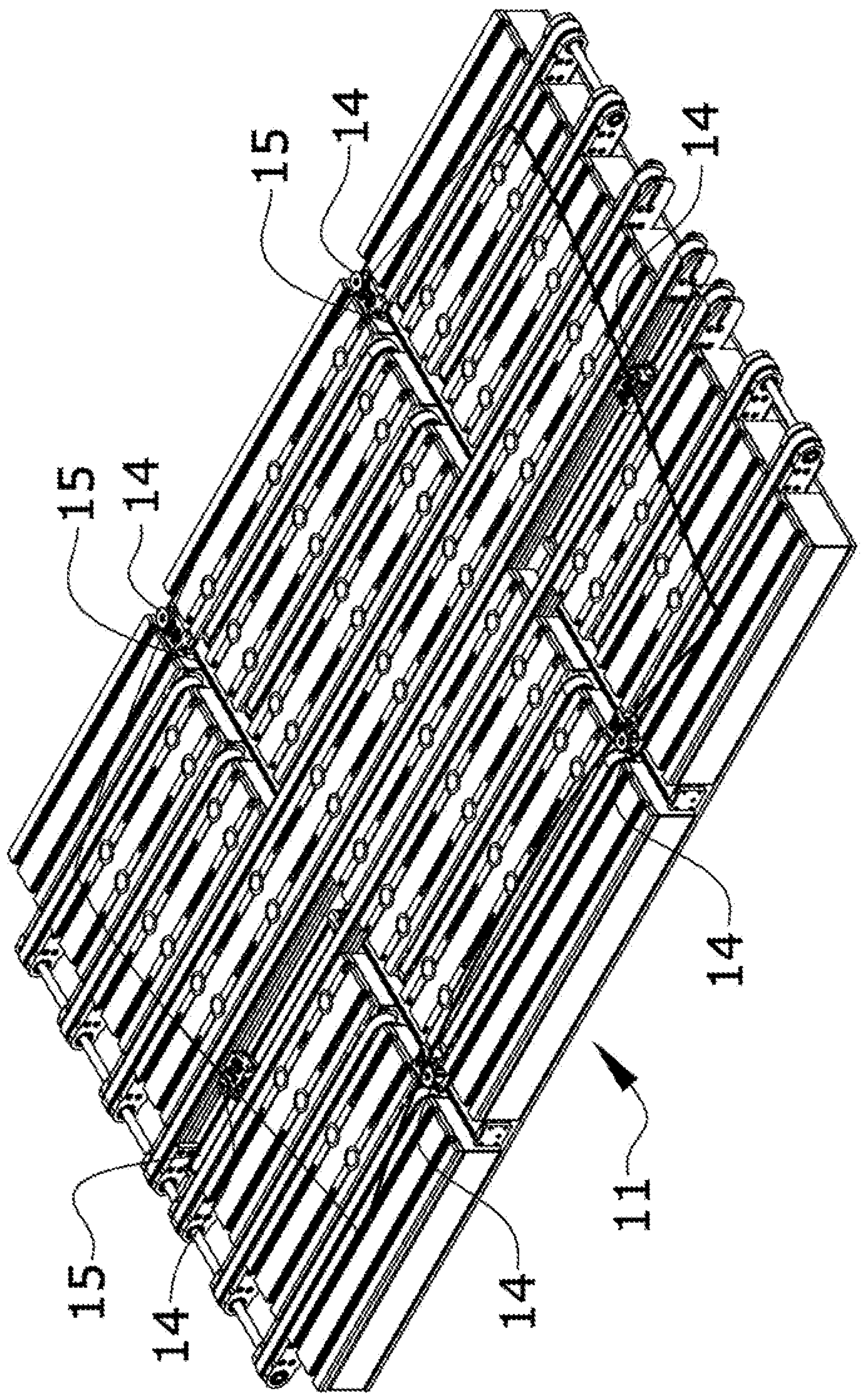
FIG. 7 shows a carriage provided with the mechanical means for fixing the glass.

FIG. 7 shows a carriage (11) for transporting the glasses (5) which is provided with mechanical fastening means, which in the embodiment shown consist of stops (14) slidable through guides (15), wherein preferably said guides are at least two, arranged transversely to each other, and on each guide (15) a pair of stops (14) is arranged, each at one end of the guide (15).

Figure 8:
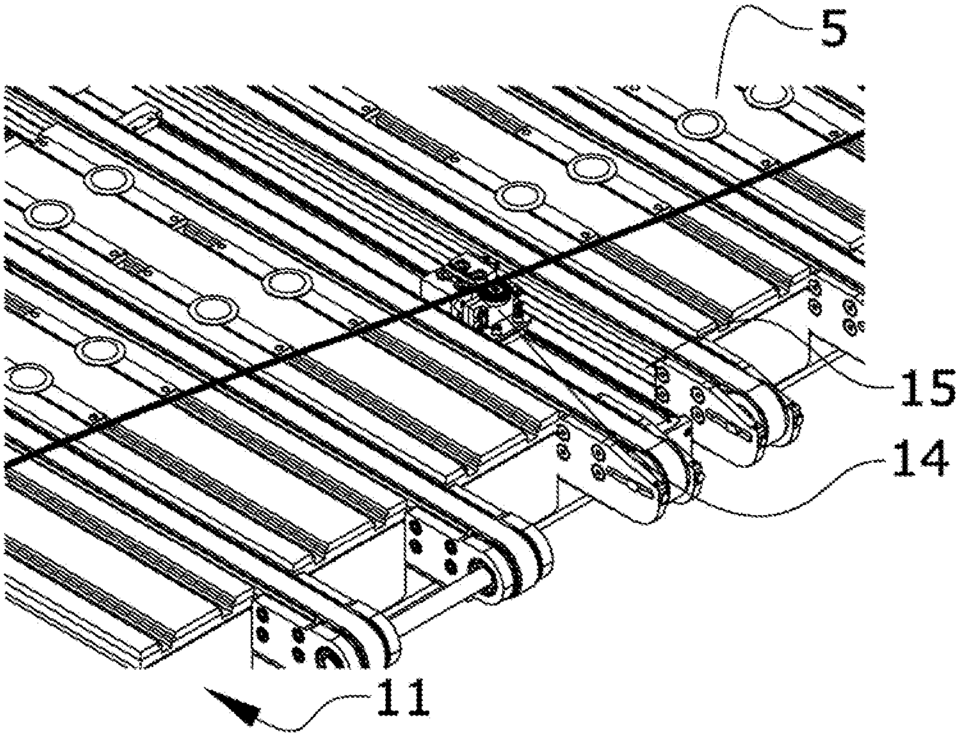
FIG. 8 shows a first detail of a fixing stop.
Figure 9:
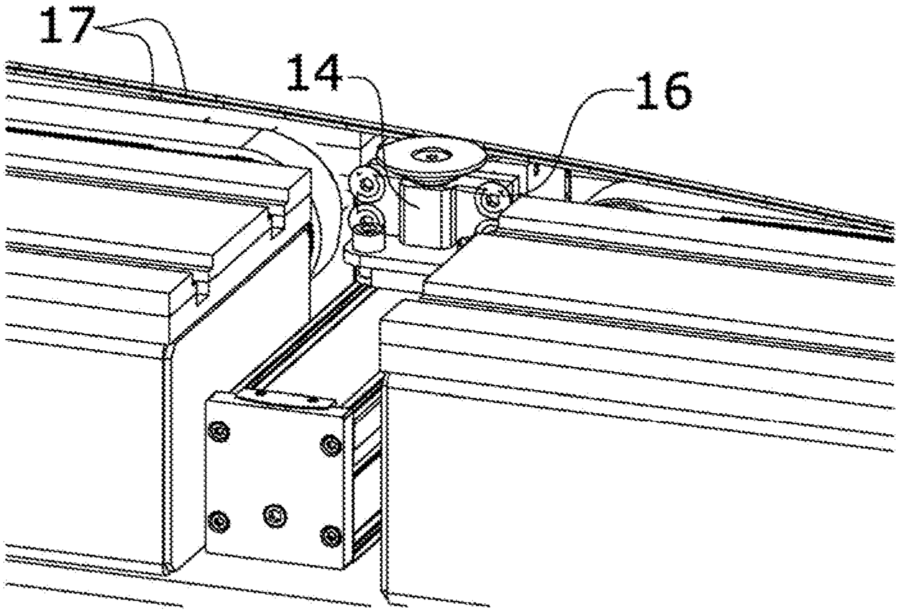
FIG. 9 shows a second detail of a fixing stop provided with a gap for fixing pairs of glasses.

FIG. 8 shows a detail of a stop (14) fixing a glass (5), while FIG. 9 shows that the stop (14) has an offset (16) for fixing glasses in pairs (17).

Figure 10:
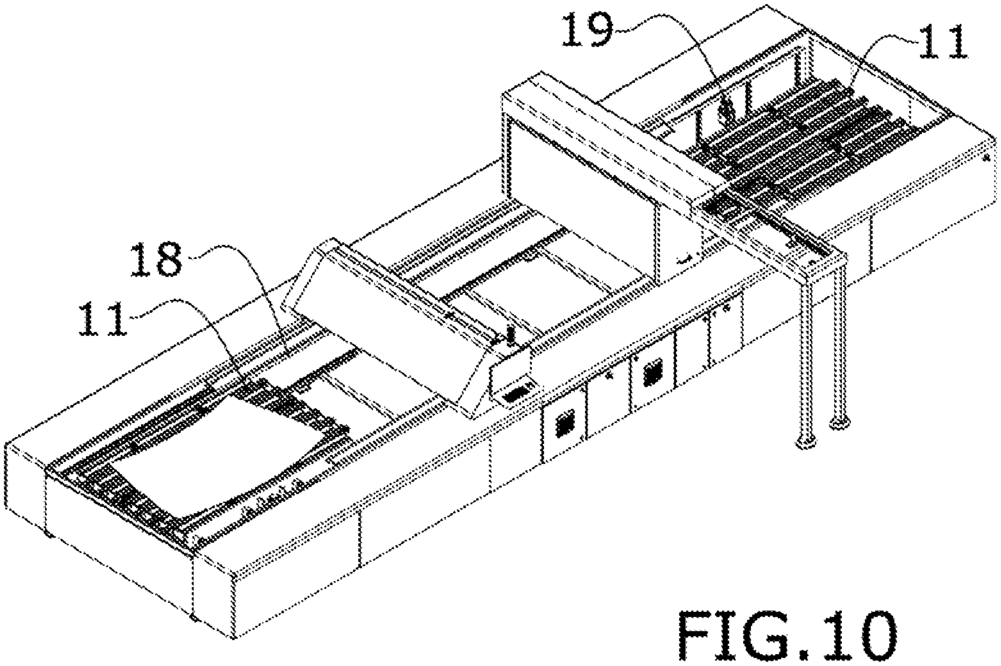
FIGS. 10 and 11 show the machine when it has two carriages where their drives can be seen.
Figure 11:
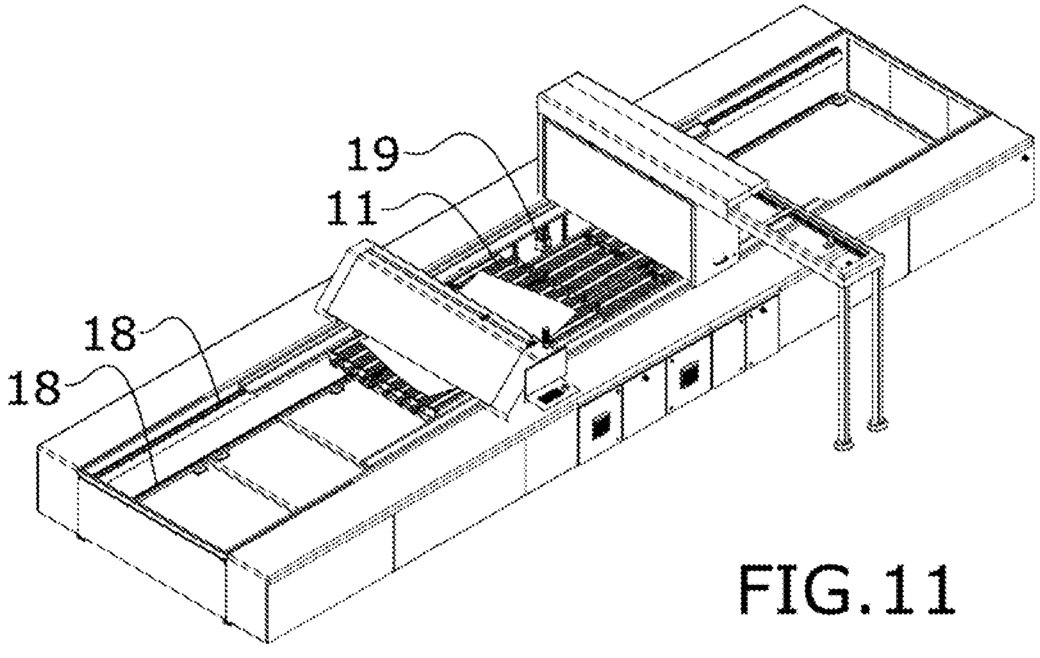

FIGS. 10 and 11 show a second embodiment of the means for achieving the lifting and lowering of the carriages from the upper level (9) to the lower level (10) and which corresponds to a machine having two carriages (11).

In this embodiment, each carriage (11) has a linear drive (18) and a lifting and lowering drive integrated, so that the linear drive (18) allows moving from the loading station to the unloading station at the upper level and back from the unloading station to the loading station at the lower level, while the lifting and lowering drive (19) lowers the carriage (11) from the upper level to the lower level when the carriage is at the unloading station and lifts it from the lower level to the upper level when the carriage is at the loading station.

FIG. 11 shows how the carriages have been moved, one by the upper level in a forward sense, and another by the lower level in a backward sense, in the latter case showing that the carriage drags with it the lifting and lowering drive (19) when forming part of the carriage (11).

Having sufficiently described the nature of the present invention, in addition to the manner in which to put it into practice, it is hereby stated that, in its essence, it may be put into practice in other embodiments that differ in detail from that indicated by way of example, and to which the protection equally applies, provided that its main principle is not altered, changed or modified.

The invention claimed is:

1. A glass-printing machine with continuous glass transport, comprising:

a loading station (1) receiving glass panes to be printed,
a mechanical fixing means for fixing the glass panes (5) to be printed,
a viewing means (2) or a mechanical positioning system downstream of a charging station (1),
a printing bridge (3) arranged downstream of the viewing means or the mechanical positioning system,
an unloading station (4) allowing the unloading of the printed glass panes,
wherein the machine comprises an upper level (9) arranged above a lower level (10), a series of carriages (11) running continuously driven by linear motors (6) travelling in one direction on the upper level (9) and in the opposite direction on the lower level (10), this change of direction being made possible by lifting and lowering drives, and
wherein the mechanical fixing means consist of stops (14) slidable through guides (15), where said guides are at least two arranged transversely to each other and on each guide (15) a pair of stops (14) is arranged, each at one end of the guide (15).

2. The glass-printing machine with continuous glass transport, according to claim 1, wherein the lifting and lowering drives comprise a first vertical drive (7) in the loading station (1) that raises the carriages (11) from the lower level (10) to the upper level (9) and a second vertical drive (8) in the unloading station (4) that lowers the carriages (11) from the upper level (9) to the lower level (10).

3. The glass-printing machine with continuous glass transport, according to claim 2, wherein the first and second vertical drives (7) and (8) can be pneumatic, electric, or hydraulic, or driven by linear motors.

4. The glass-printing machine with continuous glass transport, according to claim 1, wherein the carriages (11) return to the starting point of the machine, once they have been lowered, driven by a system of belts, racks, spindles, pneumatics, totally independent of the linear movement of the upper level (9).

5. The glass-printing machine with continuous glass transport, according to claim 1, wherein the machine comprises two carriages and each carriage has a linear drive (18) and a lifting and lowering drive (19) integrated, so that the linear drive (18) allows travel from the loading station to the unloading station on the upper level and travel back from the unloading station to the loading station on the lower level, while the lifting and lowering drive (19) allows lowering the carriage (11) from the upper level to the lower level when the carriage is in the unloading station and lifting same from the lower level to the upper level when the carriage is in the loading station.

6. The glass-printing machine with continuous glass transport, according to claim 1, wherein each carriage is slotted, to be integrated and coupled with a loading or unloading belt system to transfer the glass smoothly.

7. The glass-printing machine with continuous transportation of the glass according to claim 1, wherein at the time of printing the carriages are transported with a drive that has an optical linear encoder with a resolution of less than 4 microns.

8. The glass-printing machine with continuous glass transport, according to claim 1, wherein on the lower level there is a cleaning station (12) consisting of several rollers, such when each carriage (11) passes through said cleaning station it is subjected to a cleaning process to remove any traces of paint that may have fallen on the carriage.

9. The glass-printing machine with continuous glass transport, according to claim 8, wherein on the lower level (10) there are supports (13) with quick coupling that allow configuring the machine depending on the glass such that the glass does not touch the table.

10. The glass-printing machine with continuous glass transport, according to claim 1, wherein the stops (14) have an offset (16) for paired glass panes (17).

11. The glass-printing machine with continuous glass transport, according to claim 1, wherein the stops (14) are actuated by a pneumatic cylinder.

* * * * *